(12) United States Patent
Liao et al.

(10) Patent No.: US 8,681,118 B2
(45) Date of Patent: Mar. 25, 2014

(54) TOUCH PANEL AND A METHOD OF LOCATING A TOUCH POINT OF THE SAME

(75) Inventors: Tai-Shun Liao, Miao-Li County (TW); Hsuan-Lin Pan, Miao-Li County (TW); Po-Sheng Shih, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 887 days.

(21) Appl. No.: 12/840,302

(22) Filed: Jul. 21, 2010

(65) Prior Publication Data

US 2011/0050627 A1 Mar. 3, 2011

(30) Foreign Application Priority Data

Aug. 26, 2009 (CN) .......................... 2009 1 0306115

(51) Int. Cl.
*G06F 3/045* (2006.01)
(52) U.S. Cl.
USPC .......................................................... 345/174
(58) Field of Classification Search
USPC .......................................... 345/173, 174, 176
See application file for complete search history.

(56) References Cited

U.S. PATENT DOCUMENTS

2004/0130537 A1* 7/2004 Kong et al. ................... 345/173
2005/0209392 A1* 9/2005 Luo et al. ...................... 524/496

FOREIGN PATENT DOCUMENTS

CN 201222242 Y 4/2009

* cited by examiner

*Primary Examiner* — Alexander S Beck
*Assistant Examiner* — Tony N Ngo
(74) *Attorney, Agent, or Firm* — WPAT, PC; Justin King

(57) ABSTRACT

The present disclosure is directed to a touch panel and a method of locating a touch point. An insulating layer is disposed between a first insulating substrate and a second insulating substrate. A first conductive film with anisotropic impedance is disposed between the first insulating substrate and the insulating layer, and a second conductive film with anisotropic impedance is disposed between the insulating layer and the second insulating substrate. Multiple first pads are disposed on a peripheral region of the first conductive film along a first direction, and multiple second pads are disposed on a peripheral region of the second conductive film along a second direction. The first conductive film has least impedance along the second direction, and the second conductive film has least impedance along the first direction.

19 Claims, 19 Drawing Sheets

TOUCH PANEL AND A METHOD OF LOCATING A TOUCH POINT OF THE SAME

BACKGROUND

1. Technical Field

The present disclosure relates to a touch panel, and more particularly to a touch panel having conductive films with anisotropic impedance and a method of locating a touch point.

2. Description of Related Art

Touch panels or touch screens are widely applied in electronic apparatuses, particularly in portable or hand-held electronic apparatuses, such as personal digital assistants (PDA) or mobile phones. Touch panels involve integration of resistive-type, capacitive-type or optical touch technologies and display panels.

A conventional capacitive-type touch panel includes two pattern layers made of transparent conductive materials formed on two surfaces of a glass substrate respectively to detect two-dimensional coordinates on the pattern layers. The transparent conductive material of conventional touch panel is indium tin oxide (ITO, and the manufacture of the touch panel uses semiconductor manufacture technologies such as photolithography, exposure and etching technologies etc. Due to the multiplicity or complexity of the process steps, the yield ratio of the touch panel can not be improved, and the cost and time of production can not be decreased either. Moreover, due to the limitation of the process resolution, touch control precision of the conventional touch panels can not be further upgraded.

In order to solve the above-mentioned drawbacks of the conventional touch panels, new touch panels and the method of locating a touch point are thus provided.

SUMMARY

According to one embodiment of the present disclosure, the touch panel includes, from bottom to top in sequence, a first insulating substrate, a first conductive film, an insulating layer, a second conductive film, and a second insulating substrate. Each of the first conductive film and the second conductive film has anisotropic impedance, such as carbon nanotube (CNT) films. Multiple first pads are disposed on a peripheral region of the first conductive film along a first direction such as x-axis. Multiple second pads are disposed on a peripheral region of the second conductive film along a second direction such as y-axis. The impedance of the first conductive film along the second direction is less than the impedance along other directions. The impedance of the second conductive film along the first direction is less than the impedance along other directions. Furthermore, the touch panel further includes a driving circuit for inputting electronic signals to the first or second pads, a sensing circuit for reading electronic signals sensed by the second or first pads. During locating a touch point, electronic signals are input to the first pads or the second pads, then sensed electronic signals sensed by the second pads or the first pads are read. Finally, the location of the touch point on the surface of the touch panel is determined according the sensed electronic signals.

BRIEF DESCRIPTION OF THE DRAWINGS

The accompanying drawings illustrate various embodiments of the present disclosure and are a part of the specification. The illustrated embodiments are merely examples of the present disclosure and do not limit the scope of the disclosure.

in FIG. 1A.

DETAILED DESCRIPTION

The detailed description of the present disclosure will be discussed in the following embodiments, which are not intended to limit the scope of the present disclosure, but can be adapted for other applications. While drawings are illustrated in details, it is appreciated that the scale of each component may not be expressly exactly.

Figure 1A:
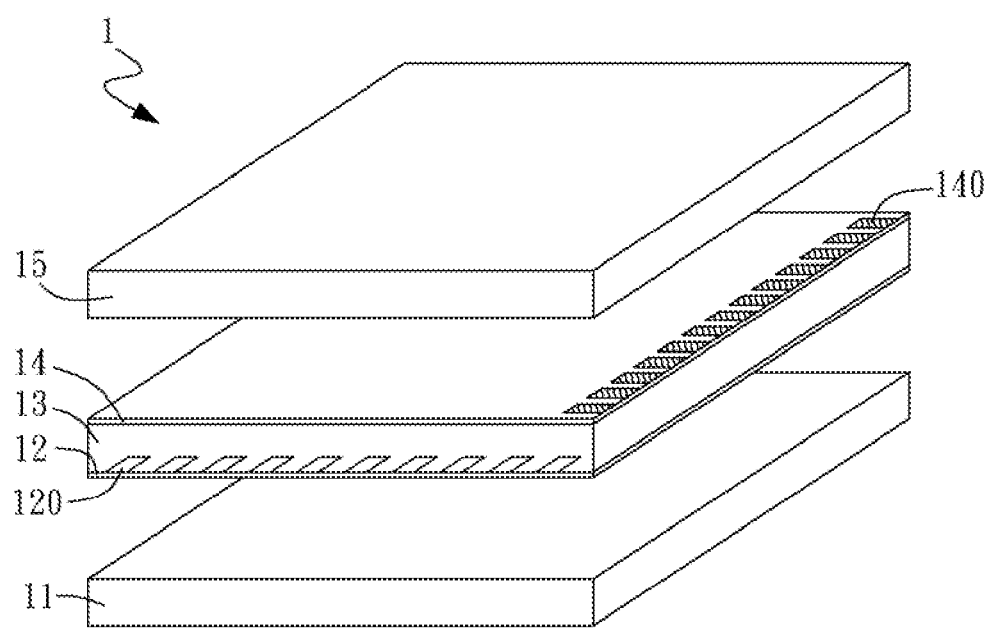
FIG. 1A shows an exploded view of a touch panel 1 of one embodiment of the present disclosure.
Figure 1B:
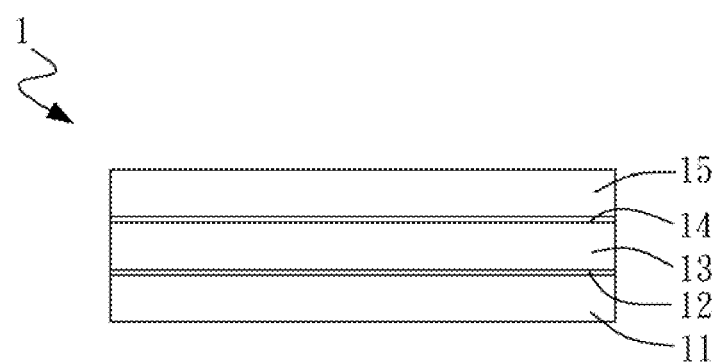
FIG. 1B shows a sectional view of the touch panel 1.

FIG. 1A shows an exploded view of a touch panel 1 of one embodiment of the present disclosure, while FIG. 1B shows a sectional view of the touch panel 1. In this embodiment, the touch panel 1 includes, from bottom to top in sequence, a first insulating substrate 11, a first conductive film 12, an insulating layer 13, a second conductive film 14, and a second insulating substrate 15. In the present specification, the terms "bottom" and "top" only indicate relative position or direction. In this embodiment, the term "top" indicates a direction toward the touch surface of the touch panel, while the term "bottom" indicates a direction away the touch surface of the touch panel. The second conductive film 14 is closer to the touch surface of the touch panel than the first conductive film 12.

The first insulating substrate 11 is used as the bottom substrate, while the second insulating substrate 15 is used as the top substrate. The insulating layer 13 is between the first insulating substrate 11 and the second insulating substrate 15. Moreover, the first conductive film 12 is between the first insulating substrate 11 and the insulating layer 13, and the second conductive film 14 is between the insulating layer 13 and the second insulating substrate 15. However, based on requirements of functions, other additional layers can also be inserted into any two of the above-mentioned layers/films.

Multiple first pads 120 are disposed on the peripheral region of the first conductive film 12 along a first direction such as x-axis or a transverse axis. Multiple second pads 140 are disposed on the peripheral region of the second conductive film 14 along a second direction such as y-axis or a longitudinal axis. In this embodiment, the first direction is optionally perpendicular to the second direction, while the first direction is not limited to be perpendicular to the second direction in other embodiments.

The materials of the first insulating substrate 11 and the second insulating substrate 15 are selected from one of the following materials or are combinations of portions of the following materials: Poly-Ethylene-Terephthalate (PET), Polycarbonate (PC), Poly-Methyl-Meth-Acrylate (PMMA), Poly-Imide (PI), and Poly-Ethylene (PE). The material of the insulating layer 13 includes, but not limited to, glass or polymer material. The materials of the first pads 120 and the second pads 140 include conductors, such as metal. The first conductive film 12 and the second conductive film 14 include conductive films with anisotropic impedance, such as carbon nanotube (CNT) films, or etched or laser cut carbon nanotube films. A plurality of laser cutting lines on the carbon nanotube film resulting from the laser cutting process may not affect the original property of anisotropic impedance. In this embodiment, the first conductive film 12 and the second conductive film 14 are CNT films without being etched or laser cut. The CNT films are formed by growing carbon nanotubes on a quartz substrate, a silicon substrate or a substrate of other materials through deposition processes such as a chemical vapor deposition (CVD) process, then each carbon nanotube is extended out by an extension process. These carbon nanotubes are connected end to end through Van Der Waals forces to form about parallel conductive lines/tubes with a definite direction. The CNT film has minimum impedance along the direction of extension and maximum impedance along the direction perpendicular to the direction of extension so as to have anisotropic impedance.

Figure 1C:
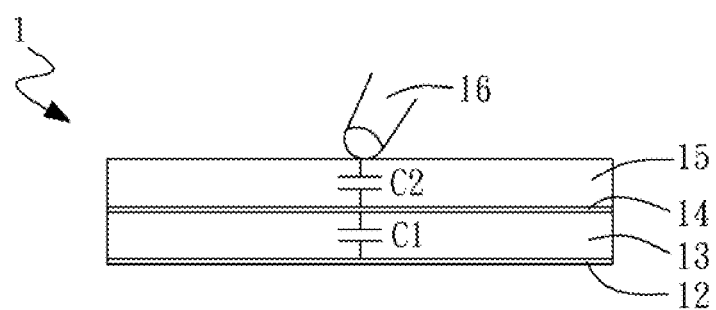
FIG. 1C shows capacitors of the touch panel formed at a touch point on the surface of the touch panel.

FIG. 1C shows capacitors of the touch panel 1 formed at a touch point on the surface of the touch panel 1, while a first capacitor C1 is formed between the first conductive film 12 and the second conductive film 14, and a second capacitor C2 is formed between the second conductive film 14 and a stylus or a finger 16. When the finger 16 touches different positions, the values of the first capacitor C1 and the second capacitor C2 may also be different. The structure of the touch panel 1 constitutes a capacitive-type touch panel.

Figure 2A:
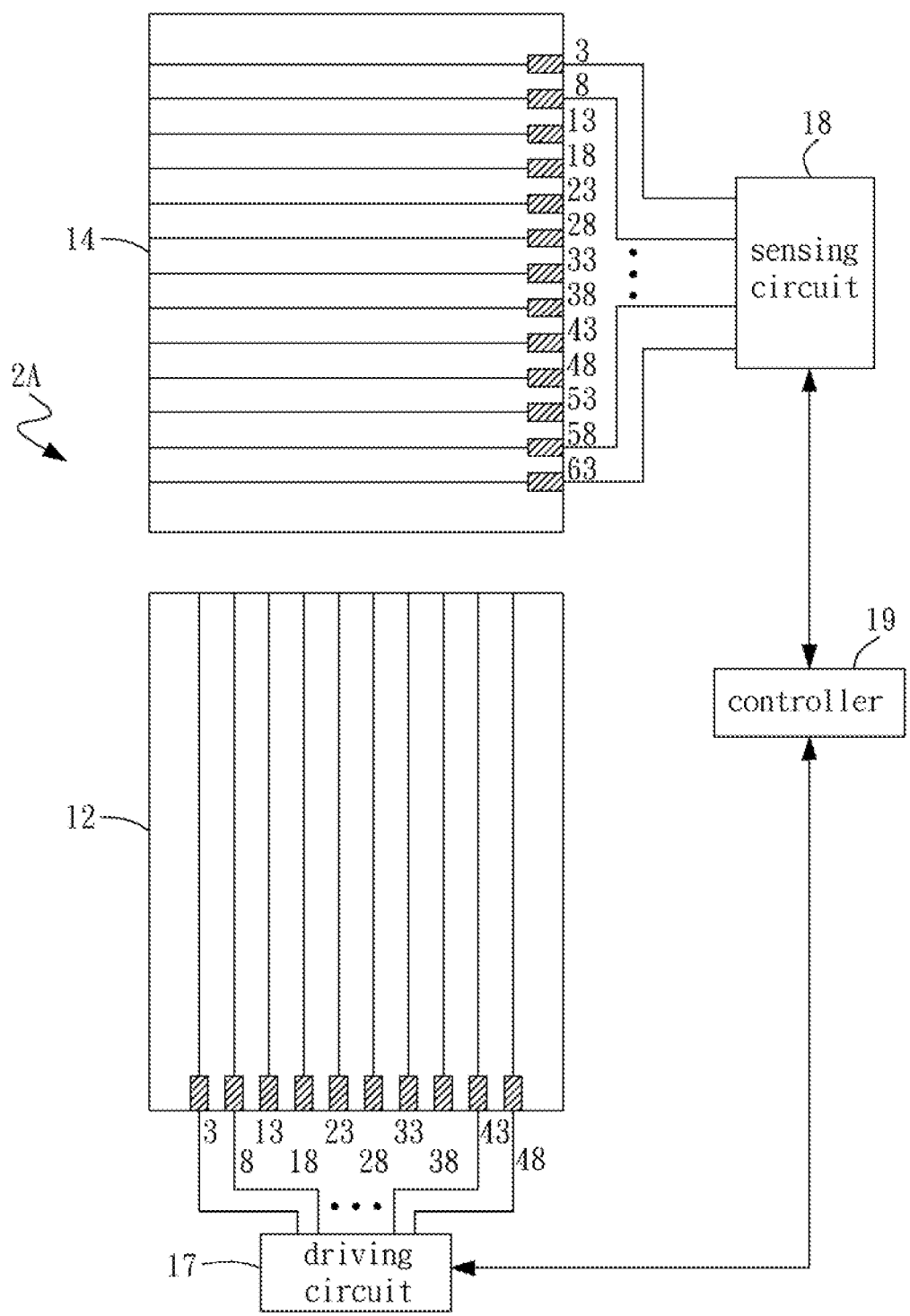
FIG. 2A shows a touch point locating system of the touch panel of the first embodiment of the present disclosure.

FIG. 2A shows a touch point locating system 2A of the touch panel of the first embodiment of the present disclosure.

The impedance of the first conductive film 12 along the second direction such as y-axis or a longitudinal axis is minimum and relatively less than the impedance along other directions. The impedance of the second conductive film 14 along the first direction such as x-axis or a transverse axis is minimum and relatively less than the impedance along other directions. Each first pad 120 connects to an electronic signal input circuit or a driving circuit 17 via conductive lines. The driving circuit 17 inputs electronic signals with the same pulse waveform or other waveforms to each first pad 120 in sequence or simultaneously. Each second pad 140 connects to an electronic signal readout circuit or a sensing circuit 18 via conductive lines to read out sensed electronic signals of each second pad 140. The first pad 120 is used as the driving electronic signal pad, while the second pad 140 is used as the sensing electronic signal pad. The driving circuit 17 and the sensing circuit 18 are controlled by a controller 19.

Figure 2B:
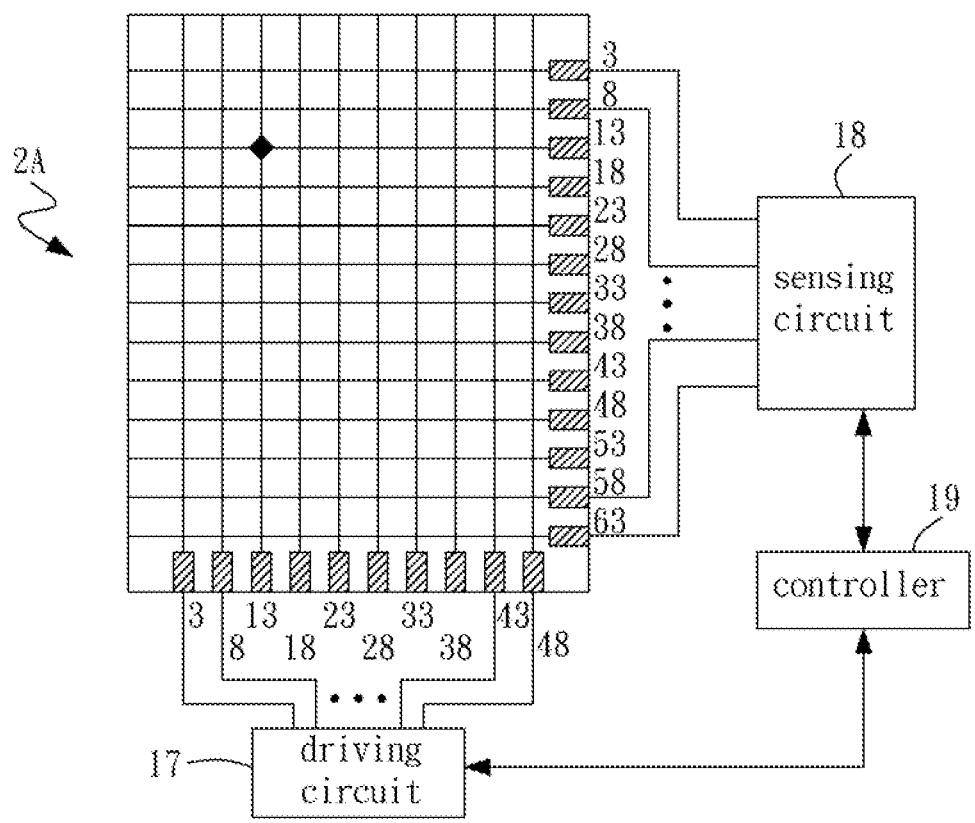
FIG. 2B shows a schematic diagram of the combination of the first conductive film and the second conductive film in FIG. 2A.

FIG. 2B shows a schematic diagram of the combination of the first conductive film 12 and the second conductive film 14. In FIG. 2A and FIG. 2B, ten first pads 120 are shown and designated as 3, 8, 13, 18, 23, 28, 33, 38, 43, and 48, and thirteen second pads 140 are shown and designated as 3, 8, 13, 18, 23, 28, 33, 38, 43, 48, 53, 58 and 63. When the stylus or the finger 16 touches the touch panel 1, through the touch point locating system 2A of the touch panel 1, the capacitance values of the first capacitor C1 and the second capacitor C2 generate sensed electronic signals with specific features on the second pads 140 so as to determine the coordinate of the touch point on the surface of the touch panel 1 such as x coordinate of x-axis or a transverse axis and y coordinate of y-axis or a longitudinal axis.

Figure 3A:
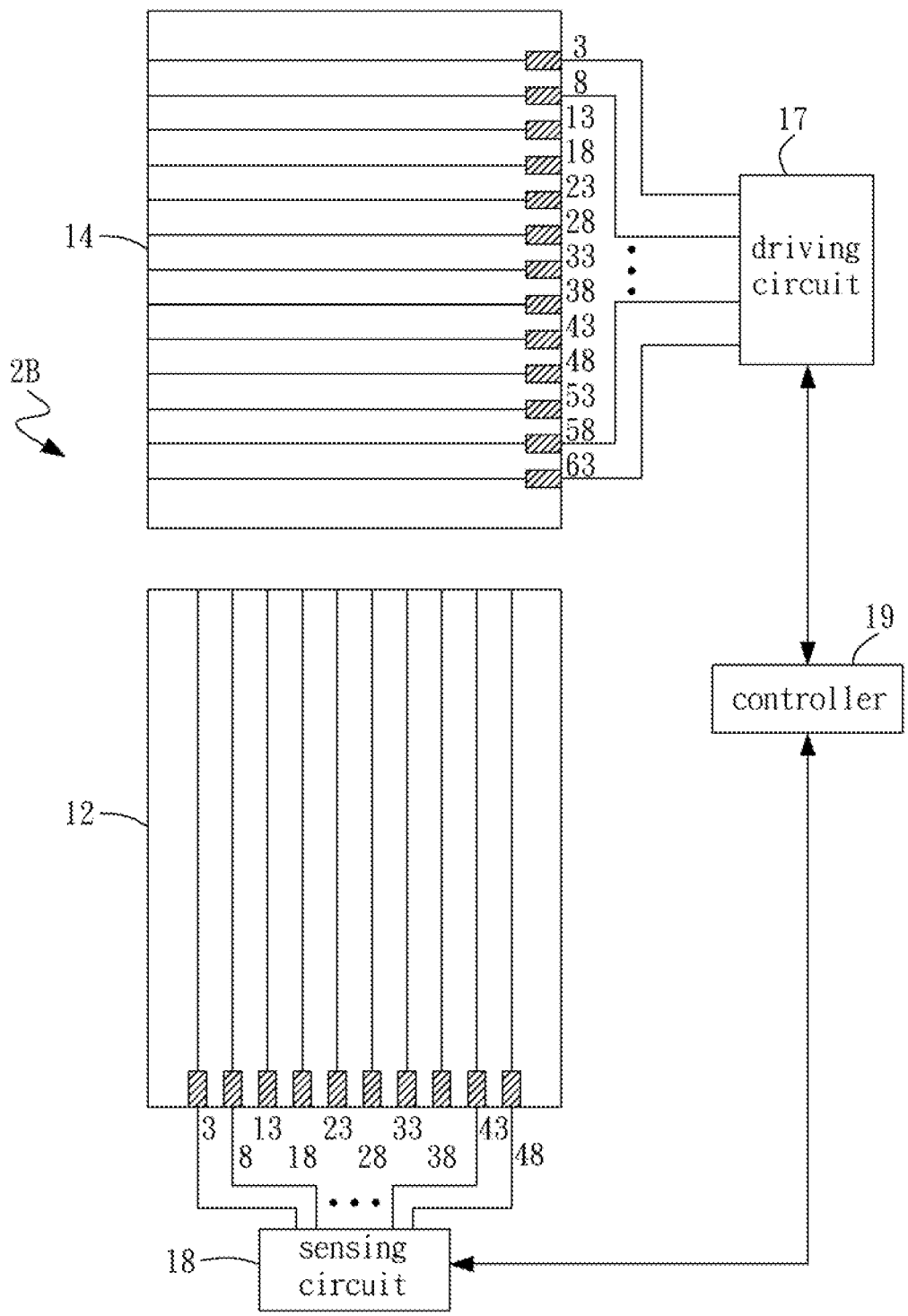
FIG. 3A shows a touch point locating system of the touch panel of the second embodiment of the present disclosure.

FIG. 3A shows a touch point locating system 2B of the touch panel of the second embodiment of the present disclosure. Similar to the touch point locating system shown in FIG. 2A, the impedance of the first conductive film 12 along the second direction such as y-axis or a longitudinal axis is minimum and relatively less than the impedance along other directions. The impedance of the second conductive film 14 along the first direction such as x-axis or a transverse axis is minimum and relatively less than the impedance along other directions. The differences are in that each second pad 140 connects to an electronic signal input circuit or a driving circuit 17 via conductive lines. The driving circuit 17 inputs electronic signals with the same pulse waveform or other waveforms to each first pad 140 in sequence or simultaneously. Each first pad 120 connects to an electronic signal readout circuit or a sensing circuit 18 via conductive lines to read out sensed electronic signals of each second pad 120. The second pad 140 is used as the driving electronic signal pad, while the first pad 120 is used as the sensing electronic signal pad. The driving circuit 17 and the sensing circuit 18 are controlled by a controller 19.

Figure 3B:
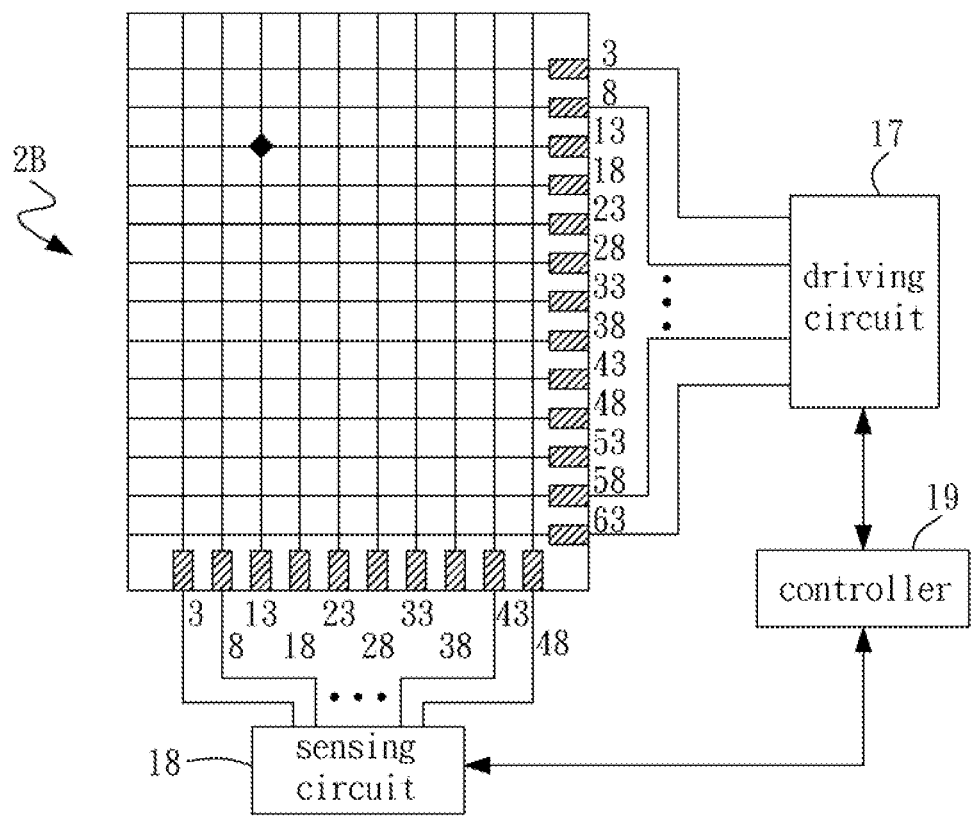
FIG. 3B shows a schematic diagram of the combination of the first conductive film and the second conductive film shown in FIG. 3A.

FIG. 3B shows a schematic diagram of the combination of the first conductive film 12 and the second conductive film 14. In FIG. 3A and FIG. 3B, ten first pads 120 are shown and designated as 3, 8, 13, 18, 23, 28, 33, 38, 43, and 48, and thirteen second pads 140 are shown and designated as 3, 8, 13, 18, 23, 28, 33, 38, 43, 48, 53, 58 and 63. When the stylus or the finger 16 touches the touch panel 1, through the touch point locating system 2A of the touch panel 1, the capacitance values of the first capacitor C1 and the second capacitor C2 generate sensed electronic signals with specific features on the second pads 120 so as to determine the coordinate of the touch point on the surface of the touch panel 1 such as x coordinate of x-axis or a transverse axis and y coordinate of y-axis or a longitudinal axis.

Figure 4A:
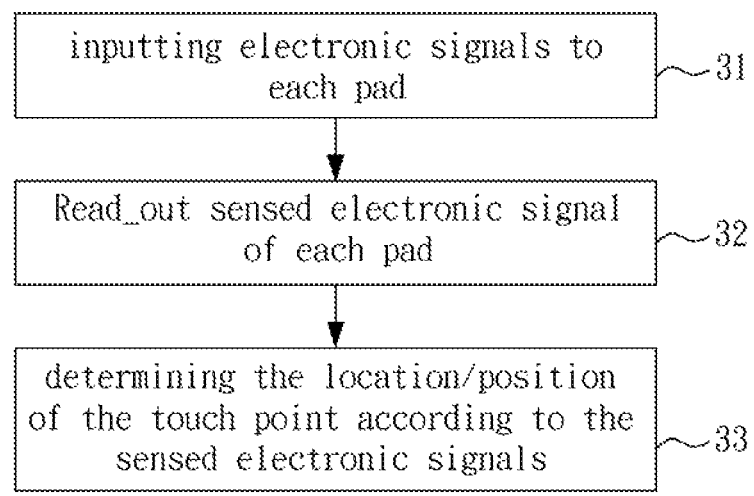
FIG. 4A shows a method of locating a touch point on the touch panel of one embodiment of the present disclosure.

FIG. 4A shows a method of locating a touch point on the touch panel of one embodiment of the present disclosure. First of all, in step 31, electronic signals with the same pulse waveforms or other waveforms are input from the driving circuit 17 to each pad in sequence or simultaneously. The pad includes the first pad 120 shown in FIG. 2B or the second pad 140 shown in FIG. 3B. Then in step 32, the sensed electronic signal of each pad is read out by the sensing circuit 18. The pad includes the second pad 140 shown in FIG. 2B or the first pad 120 shown in FIG. 3B. In step 33, the location/position of the touch point on the surface of the touch panel 1 is determined by the controller 19 according to the sensed electronic signals.

Figure 4B:
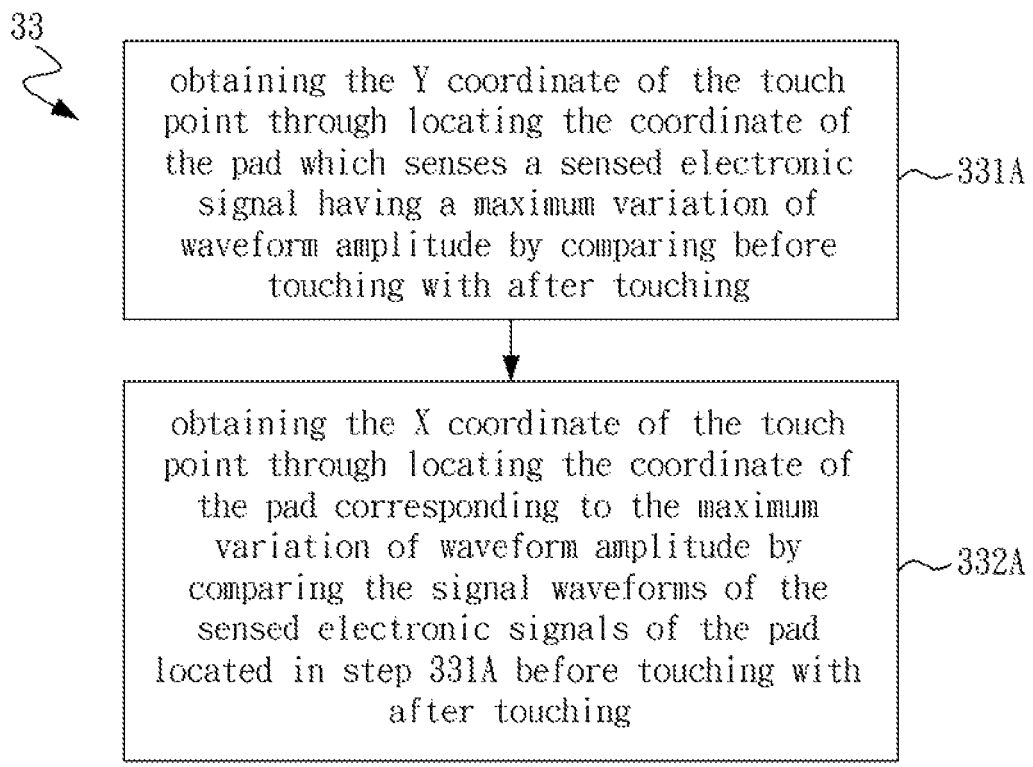
FIG. 4B shows a flow chart of determining the coordinate of the touch point on the system shown in FIG. 2B.

For the touch point locating system 2A of the touch panel shown in FIG. 2B, the first conductive film 12 is used as the bottom conductive film, and the second conductive film 14 is used as the top conductive film, such that the electronic signals are input to the bottom conductive film and the sensed electronic signals are generated from the top conductive film. The step 33 of determining the location/position of the touch point on the surface of the touch panel 1 includes steps 331A and 332A shown in FIG. 4B. In step 331A, the coordinate of the touch point along the second direction or y-axis or the longitudinal axis is obtained through locating the coordinate or position of the pad such as the second pad 140 designated as 13 sensing the electronic signal with a maximum variation of waveform amplitude by comparing before touching with after touching. In step 332A, the coordinate of the touch point along the first direction or x-axis or the transverse axis is obtained through locating the coordinate or position of the pad such as the first pad 120 corresponding to the maximum variation of the waveform amplitude by comparing the signal waveforms of the sensed electronic signals of the second pad 140 designated as 13 shown in FIG. 2C before touching with after touching.

Figure 2C:
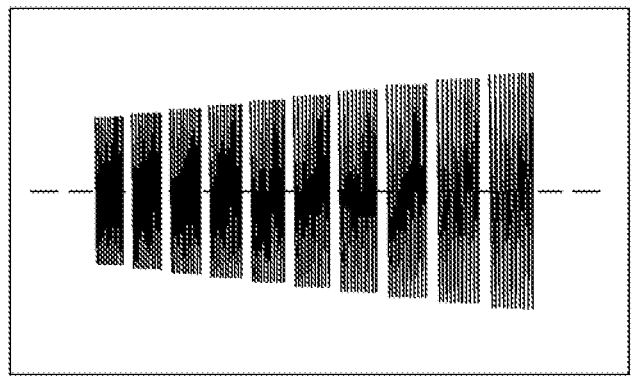
FIG. 2C shows the signal waveforms of the sensed electronic signals by any pad shown in FIG. 2B after touching.

When the waveform of the electronic signal received by each first pad 120 is pulse waveform, the waveform of the electronic signal sensed by each second pad 140 is shown in FIG. 2C if there is only one touch point. As shown in FIG. 2C, the sections of the waveform from left to right are generated from the pulse signals input by the ten first pads 120 designated from 3 to 48.

Figure 2D:
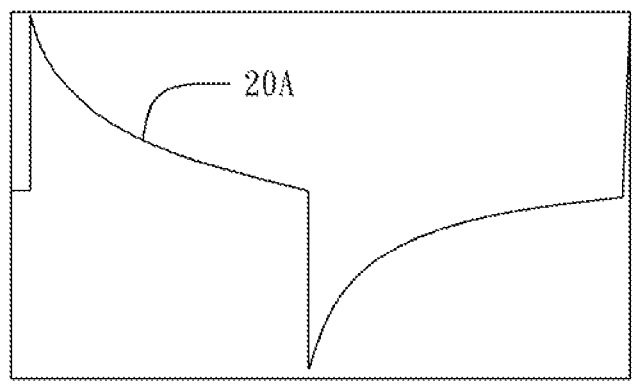
FIG. 2D shows an enlarged view of waveform of an electronic signal read out by a pad corresponding to a pulse signal input by a specific pad when no touch point is present on the touch panel shown in FIG. 2B.

Moreover, the waveform or amplitude of the sensed electronic signal resulting from the pulse signal input by the first pad 120 which is closest to the second pad 140 designated as 48 is maximum. FIG. 2D shows an enlarged view of waveform 20A of an electronic signal sensed by the second pad 140 corresponding to a pulse signal input by a first pad 120 when no touch point is present on the touch panel.

Figure 2E:
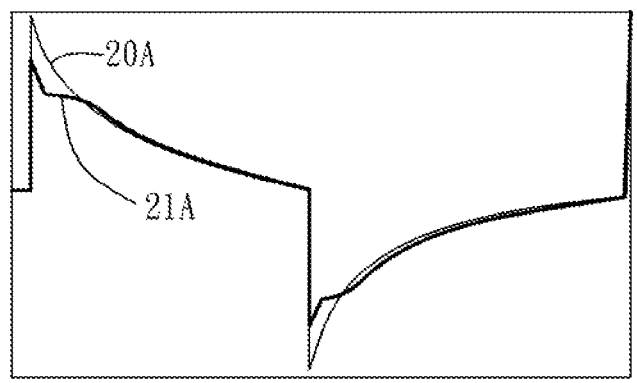
FIG. 2E shows an enlarged view of waveform of an electronic signal read out by a pad corresponding to a pulse signal input by a specific pad when a touch point is present on the touch panel shown in FIG. 2B.

FIG. 2E shows an enlarged view of waveform 21A of an electronic signal sensed by the second pad 140 such as the second pad designated as 13 corresponding to a pulse signal input by a first pad 120 when a touch point is present on the touch panel. Apparently, as shown in FIG. 2E, a maximum variation between waveform 21A of the sensed electronic signal sensed by the second pad 140 designated as 13 after touching and waveform 20A of the sensed electronic signal sensed by the same pad before touching is present when a stylus or a finger touch the touch point on the surface of the touch panel shown in FIG. 2B.

Therefore, the coordinate of the touch point along the second direction or y-axis or the longitudinal axis is obtained by the step 331A, and the coordinate of the touch point along the first direction or x-axis or the transverse axis is obtained via the step 332A.

Figure 4C:
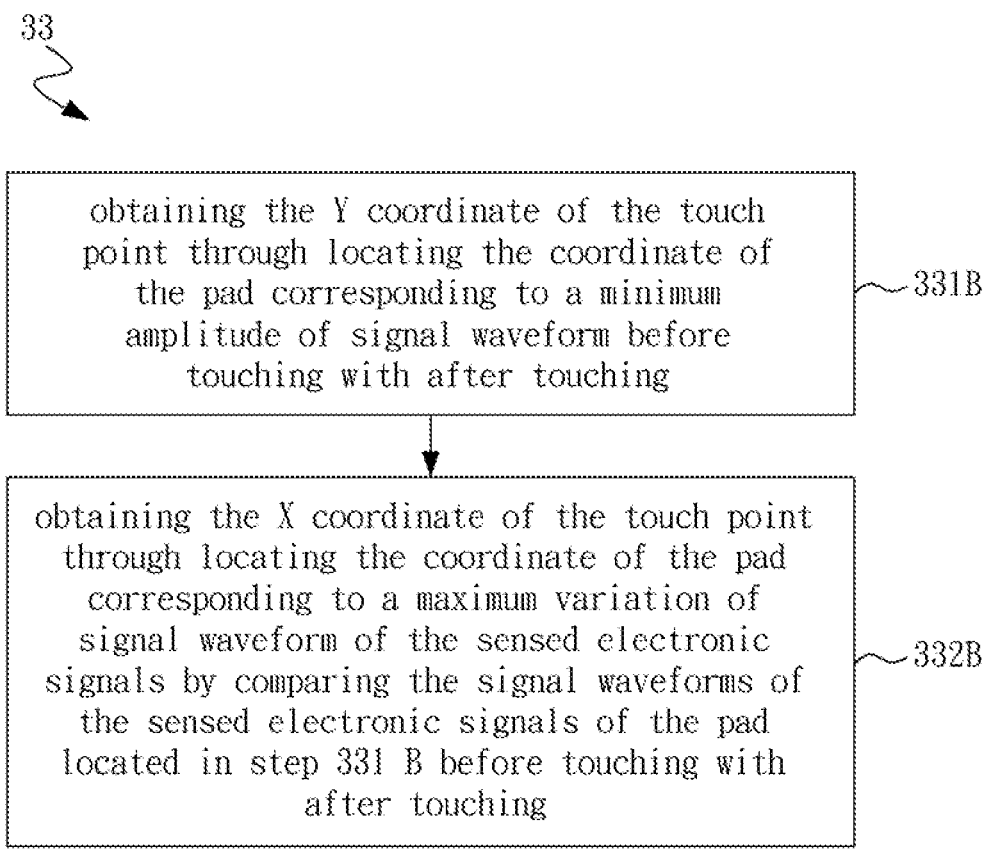
FIG. 4C shows a flow chart of determining the coordinate of the touch point on the system shown in FIG. 3B.

For the touch point locating system 2B of the touch panel shown in FIG. 3B, the first conductive film 12 is used as the bottom conductive film, and the second conductive film 14 is used as the top conductive film, such that the electronic signals are input to the top conductive film and the sensed electronic signals are generated from the bottom conductive film. The step 33 of determining the location/position of the touch point on the surface of the touch panel 1 includes steps 331B and 332B shown in FIG. 4C. In step 331B, the coordinate of the touch point along the second direction or y-axis or the longitudinal axis is obtained through locating the coordinate or position of the pad such as the second pad 140 corresponding to a minimum amplitude of signal waveform of the sensed electronic signals resulting from touching. The step 332B is used to obtain the coordinate of the touch point along the first direction or x-axis or the transverse axis.

Figure 3C:
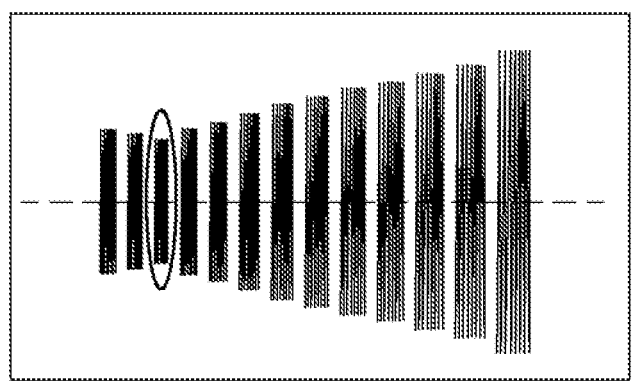
FIG. 3C shows the signal waveforms of the sensed electronic signals by any pad shown in FIG. 3B after touching.

When the waveform of the electronic signal received by each second pad 140 is pulse waveform, the waveform of the sensed electronic signal sensed by each first pad 120 is shown in FIG. 3C if there is only one touch point. As shown in FIG. 3C, the sections of the waveform from left to right are generated from the pulse signals input by the thirteen second pads 140 designated from 3 to 63.

Figure 3D:
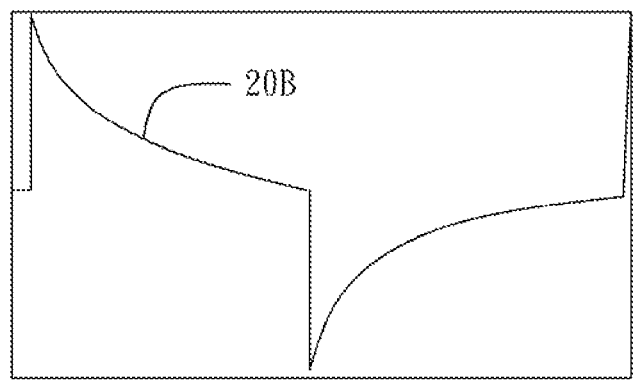
FIG. 3D shows an enlarged view of waveform of an electronic signal read out by a pad corresponding to a pulse signal input by a specific pad when no touch point is present on the touch panel.
Figure 3E:
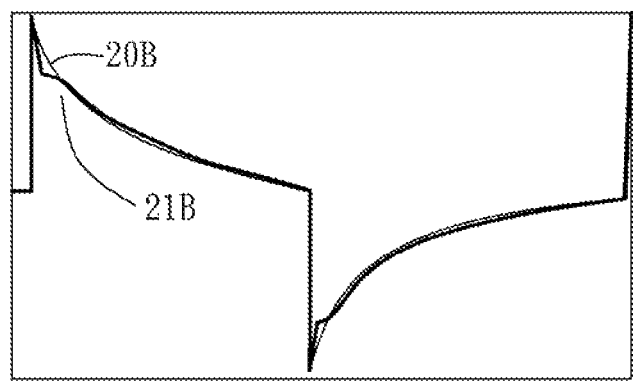
FIG. 3E shows an enlarged view of waveform of an electronic signal read out by a pad corresponding to a pulse signal input by a specific pad 140 when a touch point is present on the touch panel in FIG. 3B.

Moreover, the waveform or amplitude of the sensed electronic signal resulting from the pulse signal input by the second pad 140 which is closest to the first pad 120 designated as 63 is maximum. FIG. 3D shows an enlarged view of waveform 20B of an electronic signal sensed by the first pad 120 corresponding to a pulse signal input by the second pad 140 when no touch point is present on the touch panel. FIG. 3E shows an enlarged view of waveform 21B of an electronic signal sensed by the first pad 120 such as the first pad designated as 13 corresponding to a pulse signal input by the second pad 140 when a touch point is present on the touch panel.

As shown in FIG. 3E, a maximum variation between waveform 21B of the sensed electronic signal sensed by the first pad 120 designated as 13 after touching and waveform 20B of the electronic signal sensed by the same pad before touching is present when a stylus or a finger touch the touch point on the surface of the touch panel shown in FIG. 3B. However, since the variation between the waveform 21B of the electronic signal after touching and the waveform 20B of the electronic signal before touching is susceptible to RC delay and is not precise, the detection or determination of the coordinate of the touch point along the first direction or x-axis or the transverse axis can not solely rely on the variation between the waveform 21B and the waveform 20B. Referring to FIG. 3C, the coordinate of the touch point along the second direction or y-axis or the longitudinal axis is obtained through comparing the signal waveforms of the sensed electronic signals read out by the first pads 120 to locate the coordinate or position of the second pad 140 designated as 13 which inputs the electronic signal causing the minimum amplitude of signal waveform.

The coordinate of the touch point along the second direction or y-axis or the longitudinal axis according to step 331B is obtained through locating the coordinate or position of the pad corresponding to the minimum amplitude of signal waveform of the sensed electronic signals by comparing before touching with after touching. The coordinate of the touch point along the first direction or x-axis or the transverse axis according to step 332B is obtained through locating the coordinate or position of the pad such as the first pad 120 designated as 13 corresponding to a maximum variation of signal waveform of the sensed electronic signals by comparing the signal waveforms of the sensed electronic signals before touching with after touching.

Figure 4D:
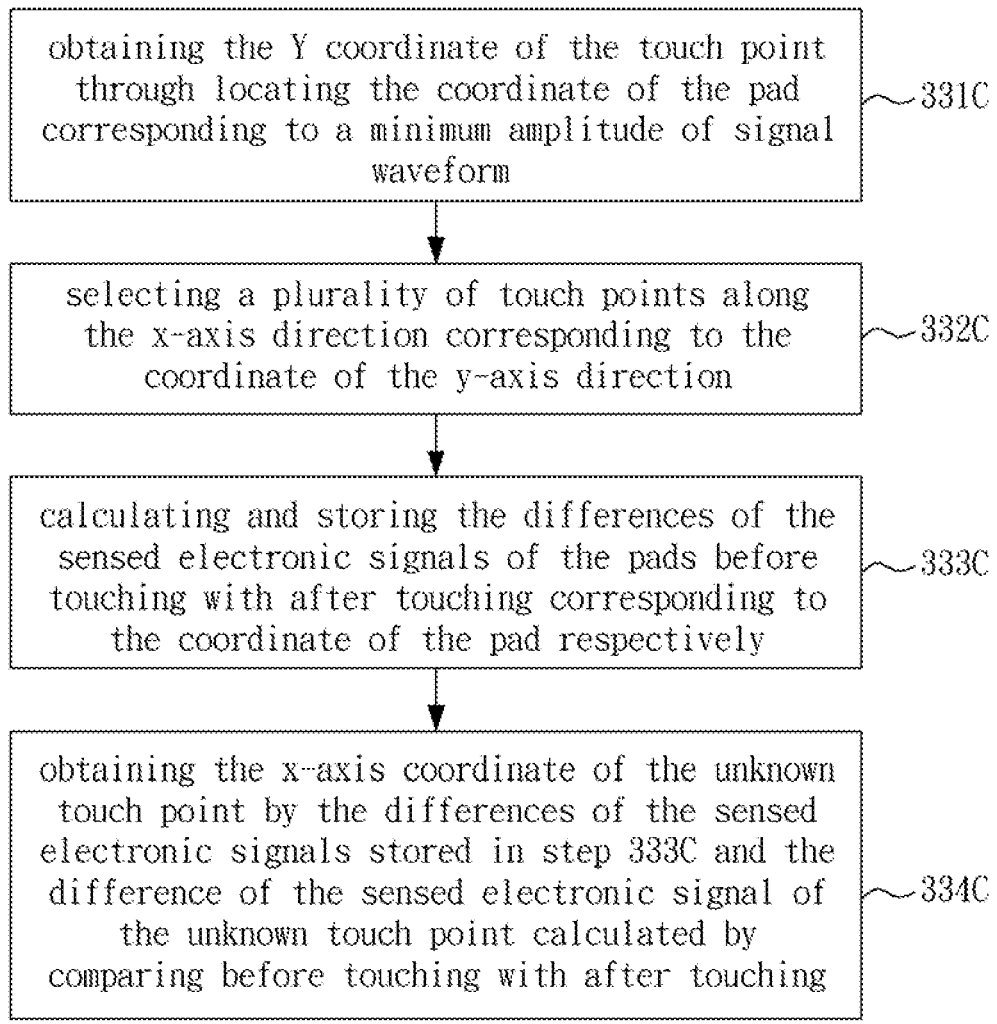
FIG. 4D shows another flow chart of determining the coordinate of the touch point on the system shown in FIG. 3B.
Figure 5A:
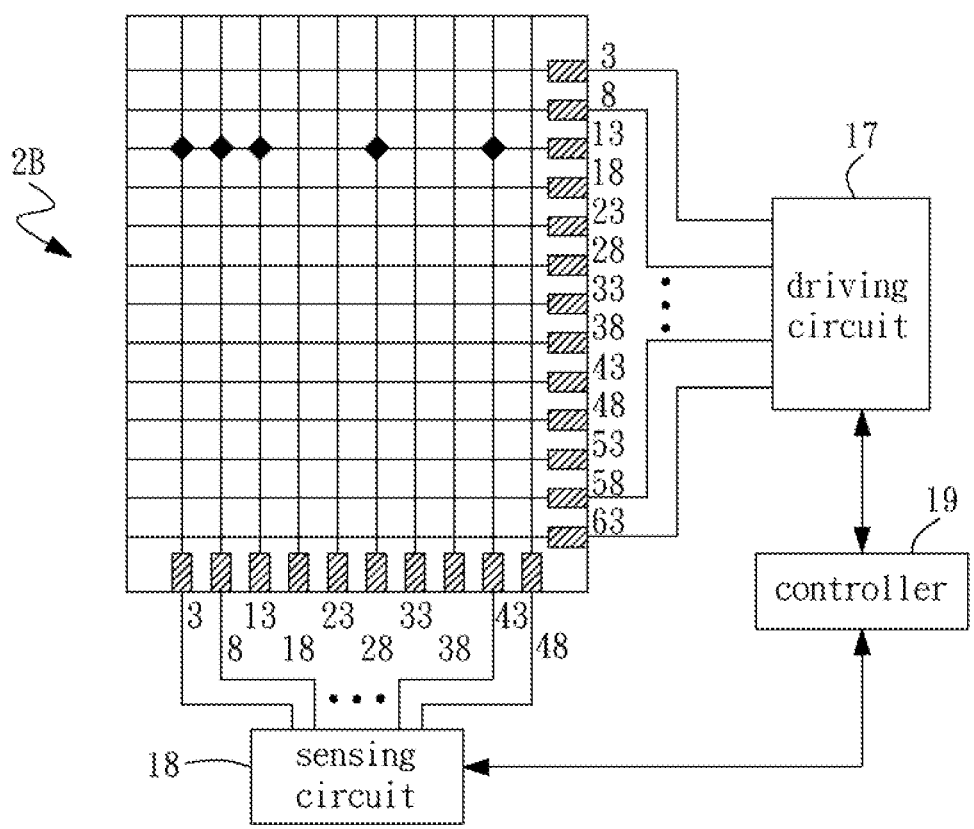
FIG. 5A shows a plurality of touch points selected along x-axis corresponding to the pad designated as 13.

However, since the variations of waveforms of electronic signals by comparing before touching with after touching sensed by adjacent first pads 120 resulting from the input pulse signal by the same pad such as the second pad 140 designated as 13 are similar, error of the detection or determination of the coordinate of the touch point along the first direction or x-axis or the transverse axis is usually present. FIG. 4D shows another embodiment of step 33 of the method of locating a touch point on the touch panel. In this embodiment, the step 331C of determining the coordinate of the touch point along the second direction or y-axis or the longitudinal axis is similar to the step 331B. The coordinate of the touch point along the second direction or y-axis or the longitudinal axis is obtained through locating the coordinate or position of the pad such as the second pad 140 designated as 13. Then in step 332C, a plurality of points are selected along the first direction or x-axis or the transverse axis corresponding to the coordinate of the second direction or y-axis or the longitudinal axis. As shown in FIG. 5A, the x-axis coordinates of these points are the x-axis coordinates of the first pads 120 designated as 3, 8, 13, 28 and 43. Next, in step 333C, the differences of the sensed electronic signals of the first pads 120 of the points before touching with after touching corresponding to the coordinate of the second pad 140 respectively are calculated and stored, and the unit of the differences of the sensed electronic signals is millivolt (mv). In step 334C, the x-axis coordinate of the unknown touch point is obtained by the differences of the sensed electronic signals stored in step 333C and the difference of the sensed electronic signal of the unknown touch point calculated by comparing before touching with after touching.

Table 1 shows an example of numerical values of the electronic signal, and the coordinates along the first direction or x-axis or the transverse axis and the coordinates along the second direction or y-axis or the longitudinal axis are respectively shown by the designated numbers of the first pads 120 used as sensing and the second pads 140 used as driving respectively.

TABLE 1

| Y axis | X axis | | | | |
|---|---|---|---|---|---|
| | 3 | 8 | 13 | 28 | 43 |
| 3 | 215 | 247 | 279 | 380 | 469 |
| 8 | 200 | 237 | 272 | 374 | 462 |
| 13 | 184 | 221 | 263 | 370 | 461 |
| 18 | 166 | 200 | 243 | 365 | 459 |
| 23 | 147 | 178 | 217 | 356 | 456 |
| 28 | 127 | 154 | 189 | 337 | 449 |
| 33 | 107 | 130 | 160 | 296 | 438 |
| 38 | 87.2 | 106 | 130 | 244 | 420 |
| 43 | 66.9 | 81.1 | 100 | 189 | 378 |
| 48 | 50.1 | 60.8 | 75.2 | 144 | 313 |

Figure 5B:
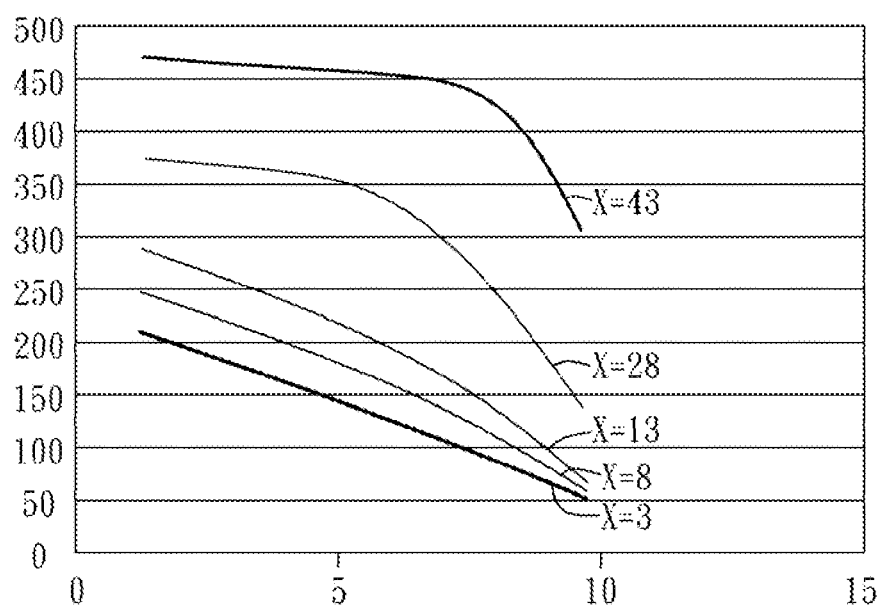
FIG. 5B shows a diagram drawn according to the values of the differences of the sensed electronic signals of a plurality of touch points selected along x-axis corresponding to the pad designated as 13.

The values in Table 1 can be used to draw FIG. 5B. The longitudinal axis represents the differences of the electronic signals before touching with after touching sensed by the pads, while the transverse axis represents the coordinates along the first direction or x-axis. The values of Table 1 or FIG. 5B can be previously stored, or can be generated by the touching of an user before using the touch panel. When the coordinates along the second direction or y-axis or the longitudinal axis are obtained through step 331C, the coordinates along the first direction or x-axis or the transverse axis are also obtained through the corresponding values of the differences of the sensed electronic signals of Table 1 or FIG. 5B.

Although specific embodiments have been illustrated and described, it will be appreciated by those skilled in the art that various modifications may be made without departing from the scope of the present disclosure, which is intended to be limited solely by the appended claims.

What is claimed is:

1. A touch panel, comprising:
    a first insulating substrate;
    a second insulating substrate;
    an insulating layer between the first and second insulating substrates;
    a first conductive film with anisotropic impedance and between the first insulating substrate and the insulating layer;
    a second conductive film with anisotropic impedance and between the insulating layer and the second insulating substrate;
    a plurality of first pads disposed on a peripheral region of the first conductive film along a first direction; and
    a plurality of second pads disposed on a peripheral region of the second conductive film along a second direction;
    wherein the impedance of the first conductive film along the second direction is less than the impedance of the first conductive film along other directions, and the impedance of the second conductive film along the first direction is less than the impedance of the second conductive film along other directions.

2. The touch panel of claim 1, wherein one of the first conductive film and the second conductive film comprises a carbon nanotube film.

3. The touch panel of claim 2, wherein the carbon nanotube film has a plurality of laser cutting lines.

4. The touch panel of claim 1, wherein the material of one of the first insulating substrate and the second insulating substrate is selected from the group consisting of Poly-Ethylene-Terephthalate, Polycarbonate, Poly-Methyl-Meth-Acrylate, Poly-Imide, and Poly-Ethylene.

5. The touch panel of claim 1, wherein the first direction is perpendicular to the second direction.

6. The touch panel of claim 1, further comprising: a driving circuit for inputting electronic signals to the first pads; and a sensing circuit for reading out sensed electronic signals sensed by the second pads.

7. The touch panel of claim 6 further comprising a controller for controlling the driving circuit and the sensing circuit, wherein the controller determines a location of a touch point on the touch panel according to the sensed electronic signals read out by the sensing circuit.

8. The touch panel of claim 1, further comprising:
    a driving circuit for inputting electronic signals to the second pads; and
    a sensing circuit for reading out sensed electronic signals sensed by the first pads.

9. The touch panel of claim 8, further comprising a controller for controlling the driving circuit and the sensing circuit, wherein the controller determines a location of a touch point on the touch panel according to the sensed electronic signals read out by the sensing circuit.

10. A method of locating a touch point on a touch panel, comprising:
    providing a touch panel, comprising:
        a first conductive film with anisotropic impedance,
        a second conductive film with anisotropic impedance,
        an insulating layer between the first and second conductive films,
        a plurality of first pads disposed on a peripheral region of the first conductive film along a first direction, and
        a plurality of second pads disposed on a peripheral region of the second conductive film along a second direction, wherein the second conductive film is closer to a touch surface of the touch panel than the first conductive film, the impedance of the first conductive film along the second direction is less than the impedance of the first conductive film along other directions, and the impedance of the second conductive film along the first direction is less than the impedance of the second conductive film along other directions;

inputting electronic signals to said first pads;

reading out sensed electronic signals sensed by said second pads; and determining a location of a touch point on said touch surface according to the sensed electronic signals.

11. The method of claim 10, wherein one of said first conductive film or said second conductive film comprises parallel conductive lines of carbon nanotubes, wherein said first conductive film or said second conductive film has minimum impedance along said parallel conductive lines, and maximum impedance perpendicular to said parallel conductive lines.

12. The method of claim 10, wherein the first direction is perpendicular to the second direction.

13. The method of claim 10, wherein the step of determining the location of the touch point on the touch surface according to the sensed electronic signals comprises:

locating a coordinate of the second pad corresponding to the sensed electronic signal with a maximum variation of waveform amplitude by comparing before touching with after touching; and locating a coordinate of the first pad corresponding to the maximum variation of waveform amplitude.

14. A method of locating a touch point on a touch panel, comprising:

providing a touch panel, comprising:
a first conductive film with anisotropic impedance,
a second conductive film with anisotropic impedance,
an insulating layer between the first and second conductive films,
a plurality of first pads disposed on a peripheral region of the first conductive film along a first direction, and
a plurality of second pads disposed on a peripheral region of the second conductive film along a second direction, wherein the second conductive film is closer to a touch surface of the touch panel than the first conductive film, the impedance of the first conductive film along the second direction is less than the impedance of the first conductive film along other directions, and the impedance of the second conductive film along the first direction is less than the impedance of the second conductive film along other directions;

inputting electronic signals to said second pads;

reading out sensed electronic signals sensed by said first pads; and determining a location of a touch point on said touch surface according to the sensed electronic signals.

15. The method of claim 14, wherein one of said first conductive film or said second conductive film comprises parallel conductive lines of carbon nanotubes, wherein said first conductive film or said second conductive film has minimum impedance along said parallel conductive lines, and maximum impedance perpendicular to said parallel conductive lines.

16. The method of claim 15, wherein the carbon nanotube film has a plurality of laser cutting lines.

17. The method of claim 14, wherein the first direction is perpendicular to the second direction.

18. The method of claim 14, wherein the step of determining the location of the touch point on the touch surface according to the sensed electronic signals comprises:

locating a coordinate of the second pad corresponding to a minimum waveform amplitude in the sensed electronic signals; and locating a coordinate of the first pad corresponding to the sensed electronic signal with a maximum Variation of waveform amplitude by comparing before touching with after touching.

19. The method of claim 14, wherein the step of determining the location of the touch point on the touch surface according to the sensed electronic signals comprises:

locating a coordinate of the second pad corresponding to a minimum waveform amplitude in the sensed electronic signals;

calculating and storing differences of a plurality of sensed electronic signals of points along the first direction by comparing before touching with after touching, wherein the points are corresponding to the coordinate of the second pad respectively;

determining a coordinate of the touch point along the first direction according to the stored differences of the sensed electronic signals of the points and a difference of the sensed electronic signal corresponding to the touch point calculated by comparing before touching with after touching.

* * * * *